(No Model.) 3 Sheets—Sheet 1.
W. H. SPARKS.
JUMP SEAT FOR CARRIAGES.
No. 500,354. Patented June 27, 1893.
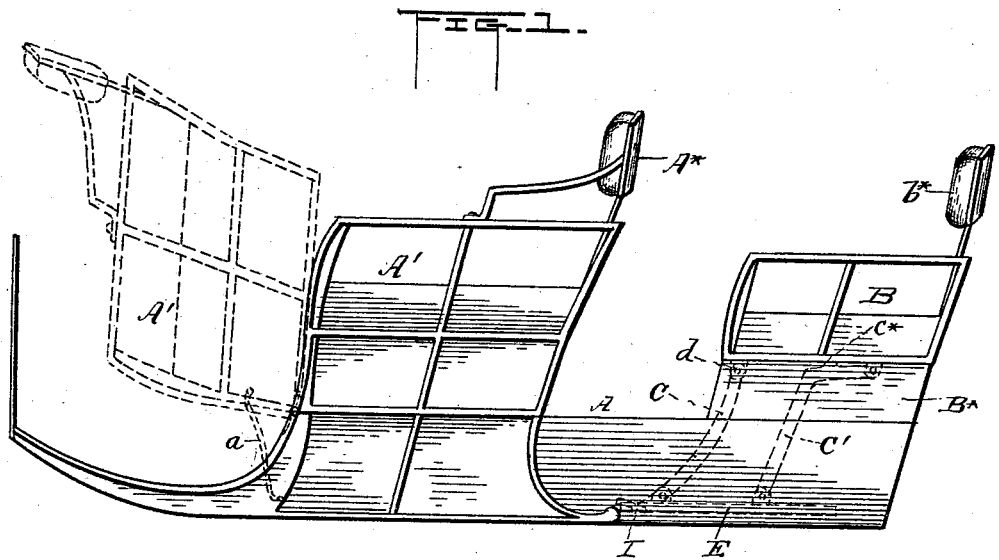
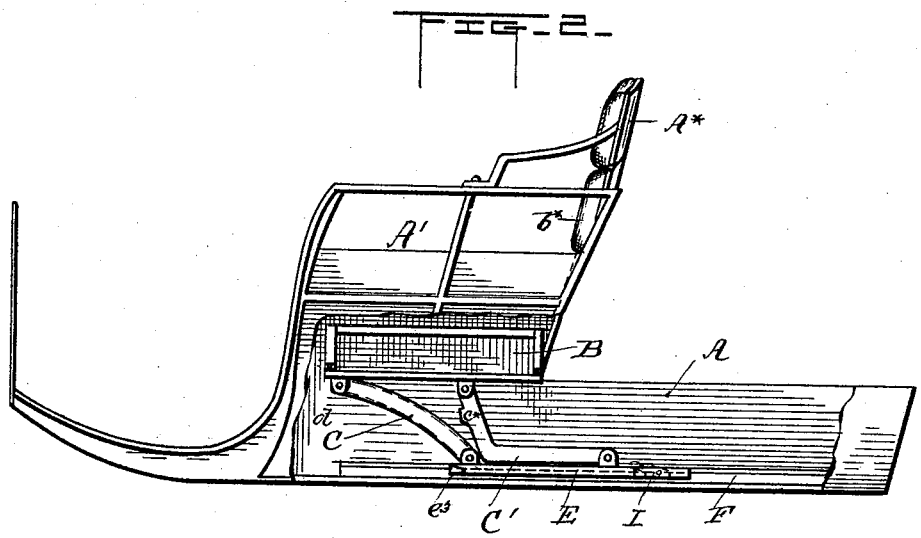
Witnesses
Severance
Fred J. Lambert
Inventor
William H. Sparks
By Thomas H. Mowlds
Attorney (No Model.)  3 Sheets—Sheet 2.
W. H. SPARKS.
JUMP SEAT FOR CARRIAGES.
No. 500,354. Patented June 27, 1893.
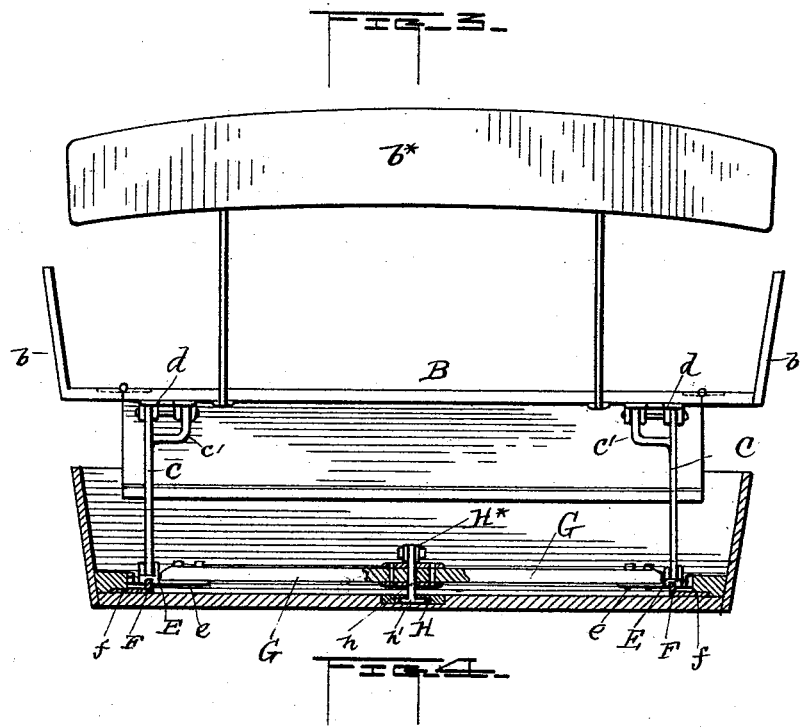
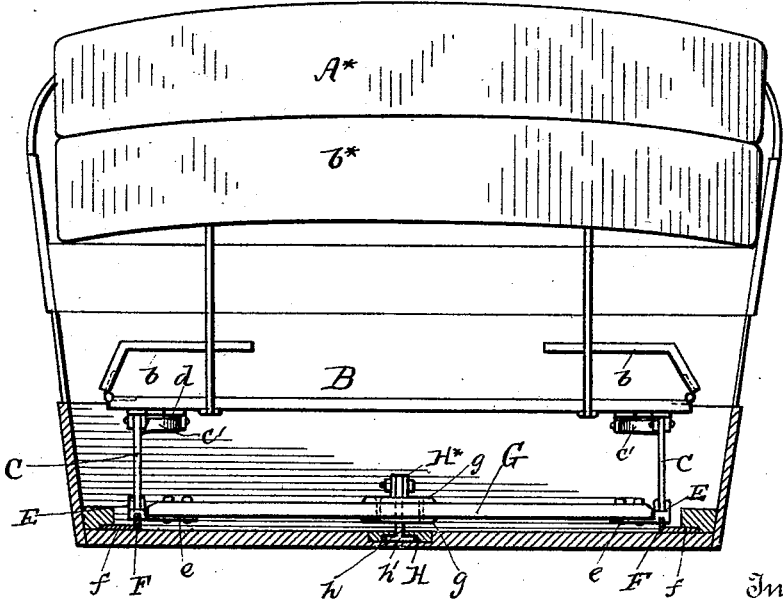
Witnesses
Severance
Fredk J. Lambert
Inventor
William H. Sparks
By Thomas D. Mouldy
Attorney (No Model.) 3 Sheets—Sheet 3.
W. H. SPARKS.
JUMP SEAT FOR CARRIAGES.
No. 500,354. Patented June 27, 1893.
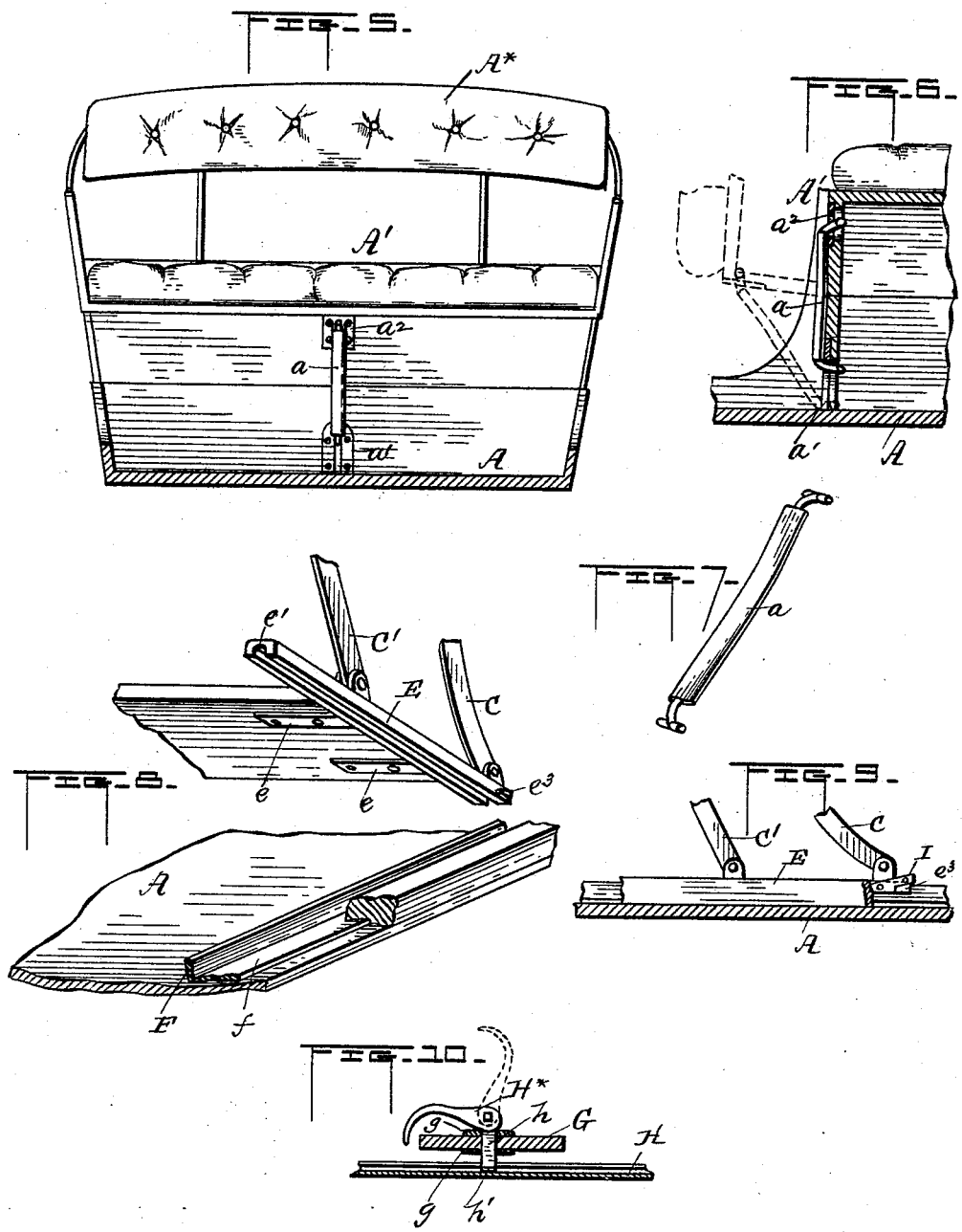
Witnesses
Severance
Fredk J. Lambert
Inventor
William H. Sparks
By Thomas D. Moulds
Attorney

UNITED STATES PATENT OFFICE.

WILLIAM H. SPARKS, OF CAMDEN, NEW JERSEY.

JUMP-SEAT FOR CARRIAGES.

SPECIFICATION forming part of Letters Patent No. 500,354, dated June 27, 1893.

Application filed December 29, 1891. Serial No. 416,423. (No model.)

*To all whom it may concern:*

Be it known that I, WILLIAM H. SPARKS, a citizen of the United States, residing at Camden, in the county of Camden and State of New Jersey, have invented certain new and useful improvements in Jump-Seats for Carriages, and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in jump seats for carriages and has for its object the provision of certain novel features of construction and operation, whereby the utility and compactness of the device are increased. Among these objects may be mentioned as the leading features: a rear seat having a combined slide and jump movement to bring it into proper position to lie under the front seat, or to stand in the rear of the carriage body for occupancy: the construction of the rear seat whereby the sides may be turned inward to lie snugly under the front seat, and whereby the lazy back of the rear seat is made to form a part of the back of the front seat when the rear seat is folded beneath the front seat; the provision of a novel stop construction whereby the front seat is held in an upright position when tilted forward to allow the adjustment of the rear seat beneath it, or to afford easy access to and from the rear seat; rigid connection of the side irons of the jump or rear seat whereby the frame thereof is made stiff and reliable; a locking device for holding the seat when in position and a stop for holding the rear seat and preventing its tipping backward when occupied.

Minor points of construction and advantages derived therefrom will appear in the following detail description.

The invention consists in the construction and combination of parts for carrying into effect the purposes and the objects above named as hereinafter fully described and pointed out in the claims.

The accompanying drawings illustrate my invention, in which—

Figure 1 is a side elevation of a carriage body having my improvements applied, with the seat shown in full lines in position for occupancy, and showing the front seat tilted forward in dotted lines, and the supports for the rear seat also in dotted lines. Fig. 2 is also a side elevation with a portion of the side board broken away to show the rear seat folded beneath the front seat. Fig. 3 is a rear elevation of the rear seat in position for occupancy showing a section of the tracks, the body and the locking device. Fig. 4 is a similar view of Fig. 3, showing the rear seat dropped, its sides folded and the whole rear seat pushed into place under the front seat. Fig. 5 is a front elevation of the front seat showing the prop in place. Fig. 6 is a sectional view of Fig. 5 taken through the prop irons, the same being on somewhat larger scale than Fig. 5. Fig. 7 is a perspective view of the prop detached. Fig. 8 is a perspective view of a portion of the carriage bottom and seat rail showing a seat slide and attached parts raised from it. Fig. 9 is a side elevation of the stop device for the rear seat, and Fig 10 is a detail view of the locking device.

Similar letters of reference indicate corresponding parts in all the figures where they occur.

A is the body of the carriage, A' is the front seat, and B is the rear seat. The front seat is hinged at its forward point of connection with the carriage bed, to allow it to be tilted forward as shown in dotted lines Fig. 1. In order, however, to hold it in the upright position shown in this figure and prevent it from falling forward on the dash board I provide a loose prop $a$, which has a head sliding under a slotted iron $a'$ secured to a board lying beneath the front seat, and its upper end held in a slotted iron $a^2$, secured on the front seat. The lower iron $a'$ has the longer slot in it and allows the prop to play up and down therein to accommodate the movements of the seat, as shown in full and dotted lines Fig. 6. The prop $a$, is preferably curved inward toward the front of the carriage seat and is made slightly yielding or elastic to give an easy stop to the forward tilting of the carriage seat. The rear seat is provided with hinged sides $b$, $b$, which may be turned over the top thereof, as shown in Fig. 4, to allow the rear seat to lie snugly under the front seat. The back seat is supported upon pivoted or jump legs, which may be of any suitable shape but I prefer those shown in the drawings marked C and C', the forward one C, being curved, and the rear one having an elbow in it on the short arm of which a rest or projection $c^*$ is provided, on which the rear seat rests, as shown in dotted lines Fig. 1. These jump-legs are pivoted at their upper ends to ears on the seat irons, the forward one of which may be double, as shown at $d$, and the forward jump leg may have a brace or auxiliary arm $c'$, which is taken between a pair of the forward ears. At their lower ends the jump legs are pivoted to the seat slides E, which ride upon the tracks F, on the sides of the carriage bottom. The track irons F, have extended side flanges $f$, which may be held under the side cleats of the carriage bottom, as shown in Figs. 3, 4, and 8. The seat slides E, have arms $e$, to which are secured the ends of a connecting board G, which extends across from slide to slide and materially stiffens the rear seat frame, holding the slides stiffly and securely at the required distance apart so that their grooves $e'$ will ride squarely and without friction upon the tracks F. This connecting board also affords means for mounting a locking device for holding the rear seat securely in place when in position for use. This locking device consists of a bolt $h$, having a head $h'$, which rides in a groove or way H in the bottom of the body, or a groove may simply be cut directly through the bottom of the body and the bolt ride in it. This bolt $h$, passes loosely through the connecting board G, which at this point may be provided with the washers $g, g$, which prevent wear upon the board, and also afford a better bearing for a cam $H^*$, which is pivoted upon the top of the bolt. When this cam is turned to the position in full lines Fig. 10, the seat will be locked so that it cannot be slid upon the tracks, which is desirable when the rear seat is in the position shown in Fig. 1, and ready for occupancy. The rear seat slides E, are provided with lugs $e^3$, on their sides at their forward ends which lie under and against the undercut stops $l$, secured upon the bottom cleats of the carriage body at a point where they will meet the lugs $e^3$, when the rear seat is pushed back into position for occupancy, as indicated in dotted lines in Fig. 1, and also in Fig. 2. These lugs and undercut stops prevent the rear seat from being tilted backward by the weight of the occupants, or when the carriage is driven over uneven roads. The rear seat is provided with a skirt $B^*$ which covers the space between the bottom of the seat and the top of the carriage body, prevents drafts and gives the device a complete and finished appearance.

If the rear and front seats are in the position shown in Fig. 1, thus making a two seated carriage, and it is desired to make a single seated vehicle, the front seat is first turned over in the position indicated by the dotted lines in Fig. 1. The sides of the rear seat are turned up in the position shown in Fig. 4. The cam H, is then turned so as to unlock the rear seat, it is then pushed toward the front seat and jumped down in position shown in Fig. 2, whereby the lazy back $b^*$ of the rear seat is brought directly beneath the back $A^*$ of the front seat as shown in Fig. 2. The rear seat may be locked in this position by again turning the cam into the position indicated in said Fig. 4.

Having thus described my invention, what I claim, and desire to secure by Letters Patent of the United States, is—

1. The combination with a seat, of slides whereby it is moved, said slides being provided with lugs on their forward ends, as described, and undercut stops secured to the carriage body for engaging said lugs when the seat is in position for occupancy, as and for the purpose set forth.

2. The combination of a seat, pivoted jump legs on which it is supported, slides to which the lower ends of said jump legs are pivoted, and tracks in the carriage body having side flanges or wings, as set forth.

3. The combination with a carriage seat, pivoted jump legs, slides connected thereto, and tracks or ways on which said slides move, of the rigid connection between said slides, and a locking device thereon for securing said seat to the floor of the carriage, as set forth.

4. In a carriage the combination with a front seat of a rear jump seat adapted to be dropped down and slid under the front seat and provided with a lazy back which lies under and forms a part of the front seat back when the jump seat is folded under the front seat, as set forth.

5. The combination of a hinged or tilting seat having a loose prop, provided with heads as described, with slotted irons in which said heads work, one of said irons being on the seat, and the other having an elongated slot, being on a fixed part of the carriage body, as set forth.

In testimony whereof I affix my signature in presence of two witnesses.

WILLIAM H. SPARKS.

Witnesses:
 FREDK. J. LAMBERT,
 THOS. D. MOWLDS.